United States Patent
Kim et al.

(10) Patent No.: US 9,434,384 B2
(45) Date of Patent: Sep. 6, 2016

(54) VEHICLE CRUISE CONTROL APPARATUS AND METHOD

(71) Applicant: Hyundai Motor Company, Seoul (KR)

(72) Inventors: Dong Woo Kim, Hwaseong-si (KR); Ju Hyun Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 3 days.

(21) Appl. No.: 14/482,808

(22) Filed: Sep. 10, 2014

(65) Prior Publication Data

US 2015/0291160 A1    Oct. 15, 2015

(30) Foreign Application Priority Data

Apr. 15, 2014    (KR) .................. 10-2014-0044839

(51) Int. Cl.
*G09G 5/00*    (2006.01)
*B60W 30/16*   (2012.01)
*G06F 3/01*    (2006.01)
*G06T 19/00*   (2011.01)

(52) U.S. Cl.
CPC .............. *B60W 30/16* (2013.01); *G06F 3/011* (2013.01); *B60W 2420/42* (2013.01); *B60W 2550/142* (2013.01); *B60W 2550/146* (2013.01); *G06T 19/006* (2013.01)

(58) Field of Classification Search
USPC ...... 345/633, 629, 632, 7, 581; 701/93, 431, 701/432; 340/425.5, 524
See application file for complete search history.

(56) References Cited

U.S. PATENT DOCUMENTS

| | | | | |
|---|---|---|---|---|
| 5,304,980 A | * | 4/1994 | Maekawa | ................. B60R 1/00 340/435 |
| 6,597,981 B2 | * | 7/2003 | Nishira | .............. B60K 31/0008 180/170 |
| 7,482,909 B2 | * | 1/2009 | Haug | ....................... B60R 1/00 340/425.5 |

(Continued)

FOREIGN PATENT DOCUMENTS

| | | | |
|---|---|---|---|
| EP | 1521059 A1 * | 4/2005 | ........... G01C 21/365 |
| JP | 2005-127995 A | 5/2005 | |

(Continued)

OTHER PUBLICATIONS

A lane marking detection and tracking algorithm based on sub-regions; Wenhui Li; Xiaohu Gong; Ying Wang; Peixun Liu; Informative and Cybernetics for Computational Social Systems (ICCSS), 2014 International Conference on; Year: 2014 pp. 68-73, DOI: 10.1109/ICCSS.2014.6961818.*

(Continued)

*Primary Examiner* — Cuong H Nguyen
(74) *Attorney, Agent, or Firm* — McDermott Will & Emery LLP (57) ABSTRACT

A vehicle cruise control apparatus of a vehicle includes a display and a controller. The display displays virtual information by projecting the virtual information on an information display region in front of a driver of the vehicle through augmented reality. The controller determines whether the front road is a slope road or a curved road based on road information while controlling driving of the vehicle according to an inter-vehicle distance and a driving speed of the preceding vehicle, determines whether the preceding vehicle exists in an information display region in front of a driver when it is determined that the front road is the slope road or the curved road, and controls the display to display a virtual preceding vehicle in the information display region through augmented reality when it is determined that the preceding vehicle does not exist.

17 Claims, 6 Drawing Sheets

(56) References Cited

U.S. PATENT DOCUMENTS

| | | | | |
|---|---|---|---|---|
| 7,561,966 | B2* | 7/2009 | Nakamura | G01C 21/365 340/461 |
| 8,970,451 | B2* | 3/2015 | Nagasawa | B60K 35/00 345/7 |
| 9,075,563 | B2* | 7/2015 | Kim | G06K 9/00832 |
| 2003/0016125 | A1* | 1/2003 | Lang | B60Q 1/2665 340/425.5 |
| 2003/0069695 | A1* | 4/2003 | Imanishi | B60R 1/00 701/301 |
| 2004/0178894 | A1* | 9/2004 | Janssen | B60K 35/00 340/435 |
| 2005/0071082 | A1* | 3/2005 | Ohmura | G01C 21/365 701/431 |
| 2005/0073583 | A1* | 4/2005 | Moisel | B60R 1/00 348/148 |
| 2005/0154505 | A1* | 7/2005 | Nakamura | G01C 21/365 701/1 |
| 2008/0078600 | A1 | 4/2008 | Inoue et al. | |
| 2012/0154441 | A1* | 6/2012 | Kim | G06K 9/00832 345/633 |
| 2015/0375679 | A1* | 12/2015 | Ann | B60R 1/00 348/148 |
| 2016/0059697 | A1* | 3/2016 | Ann | B60K 35/00 701/96 |

FOREIGN PATENT DOCUMENTS

| | | |
|---|---|---|
| JP | 3777970 B2 | 3/2006 |
| KR | 10-2009-0062527 A | 6/2009 |
| KR | 10-2011-0136339 A | 12/2011 |
| KR | 10-2012-0082602 A | 7/2012 |

OTHER PUBLICATIONS

Simulation and visualization of forest fire growth in an integrated 3D virtual geographical environment—a preliminary study; Hongyu Huang; Liyu Tang; Jianwei Li; Chongcheng Chen; Geoinformatics (Geoinformatics), 2012 20th International Conference on Year: 2012; pp. 1-6, DOI: 10.1109/Geoinformatics.2012.6270344.*

Application of virtual reality technology in bridge structure safety monitoring; Dongwei Qiu; Lanfang Gao; Computer and Information Application (ICCIA), 2010 International Conference on; Year: 2010; pp. 465-467, DOI: 10.1109/ICCIA.2010.6141637.*

An efficient method of 3D road automatic generating; Yongwei Mao; Yanjun Li; Electronic and Mechanical Engineering and Information Technology (EMEIT), 2011 International Conference on; Year: 2011, vol. 8; pp. 4048-4051, DOI: 10.1109/EMEIT.2011.6023941.*

Countermeasures for traffic accidents due to road conditions in China; Yulong Pei; Ji Ma; Intelligent Transportation Systems, 2003. Proceedings. 2003 IEEE; Year: 2003, vol. 1; pp. 226-231 vol. 1, DOI: 10.1109/ITSC.2003.1251953.*

Inducement of visual attention using augmented reality for multi-display systems in advanced tele-operation; Junjie Yang; Mitsuhiro Kamezaki; Ryuya Sato; Hiroyasu Iwata; Shigeki Sugano; Intelligent Robots and Systems (IROS), 2015 IEEE/RSJ International Conference on; Year: 2015; pp. 5364-5369, DOI: 10.1109/IROS.2015.7354135.*

* cited by examiner

VEHICLE CRUISE CONTROL APPARATUS AND METHOD

CROSS-REFERENCE TO RELATED APPLICATION

This application is based on and claims priority from Korean Patent Application No. 10-2014-0044839, filed on Apr. 15, 2014 in the Korean Intellectual Property Office, the entire content of which is incorporated herein by reference.

TECHNICAL FIELD

The present inventive concept relates to a vehicle cruise control apparatus and method, and more particularly, to a vehicle cruise control apparatus and method for avoiding a cruise control function for following a preceding vehicle (hereinafter "the preceding vehicle following cruise function") being released because the preceding vehicle is temporarily not detected as the driving road is changed from a straight road into a slope road or a curved road during the preceding vehicle following cruise, and continuously displaying the preceding vehicle using augmented reality technologies.

BACKGROUND

The driving control (e.g., cruise control) apparatus such as Adaptive Cruise Control (ACC) and Smart Cruise Control (SCC) enables the vehicle to drive while maintaining the speed without stepping on the acceleration pedal if the speed is set to a driver's desired speed. This cruise control apparatus controls the distance together with the vehicle speed, thereby enabling the vehicle to drive while maintaining the safety distance from the preceding vehicle.

The conventional cruise control apparatus temporarily releases the preceding vehicle following cruise, if the preceding vehicle is temporarily disappeared as the preceding vehicle enters into a slope section (ascending or descending section) during the preceding vehicle following cruise. Then, the cruise control apparatus resumes the preceding vehicle following cruise again, if the vehicle enters into the same section as the preceding vehicle and the preceding vehicle appears. Like this, conventionally, the transient disconnection occurs depending on the presence or absence of preceding vehicle during the preceding vehicle following cruise and thus causes the driver to feel distrust and anxiety.

SUMMARY

The object of the present inventive concept is to provide a vehicle cruise control apparatus and method for avoiding the preceding vehicle following cruise control function being released or stopped because the preceding vehicle is temporarily not detected as the driving road is changed from a straight road into a slope road or a curved road during the preceding vehicle following cruise.

Also, the object of the present inventive concept is to provide a vehicle cruise control apparatus and method for continuously displaying the preceding vehicle using augmented reality technologies if the preceding vehicle is temporarily disappeared as the preceding vehicle enters into a slope section or a curve section.

In order to achieve the above-mentioned objects, one aspect of the present inventive concept relates to a vehicle cruise control method for performing a vehicle cruise control of a vehicle includes receiving road information on a front road of the vehicle during a preceding vehicle following cruise. It is determined whether the front road is a slope road or a curved road based on the road information. It is determined whether the preceding vehicle exists in an information display region in front of a driver of the vehicle when it is determined that the front road is the slope road or the curved road. A virtual preceding vehicle is displayed in the information display region through augmented reality when it is determined that the preceding vehicle does not exist.

The road information may be one of a straight road, a slope road, and a curved road.

In displaying a virtual preceding vehicle, the virtual preceding vehicle may be displayed and it may be determined whether the preceding vehicle deviates from an inter-vehicle distance detecting range, a timer may be operated when it is determined that the preceding vehicle deviates from the inter-vehicle distance detecting range, it may be determined whether a set time is elapsed by the timer, and displaying the virtual preceding vehicle and following driving may be stopped when it is determined that the set time is elapsed.

In displaying a virtual preceding vehicle, it may be determined whether a set time is elapsed after displaying the virtual preceding vehicle, and displaying the virtual preceding vehicle and following driving may be stopped when it is determined that the set time is elapsed.

It may be determined whether the preceding vehicle is re-detected in the information display region when it is determined that the set time is not elapsed as the result of checking whether the set time is elapsed. It may be switched from a virtual display mode displaying the virtual preceding vehicle to a basic display mode when it is determined that the preceding vehicle is re-detected.

The set time may be calculated based on a driving condition such as a driving speed and an inter-vehicle distance set by the driver.

A basic display mode may be maintained, when it is determined that the preceding vehicle exists in the information display region.

In the basic display mode a preceding vehicle indicator may be displayed at a side of the preceding vehicle located in the information display region.

The preceding vehicle indicator may be implemented as a type of at least one of an image, a text, and an animation.

It may be determined whether the preceding vehicle deviates from the information display region, and the virtual preceding vehicle may be displayed as an image other than an image of a vehicle when it is determined that the preceding vehicle deviates from the information display region.

Another aspect of the present inventive concept encompasses a vehicle cruise control apparatus including a front camera, inter-vehicle distance detector, a road information provider, a display and a controller. The front camera is configured to take a front image of a road during its vehicle. The inter-vehicle distance detector is configured to measure an inter-vehicle distance between the vehicle and a preceding vehicle. The road information provider is configured to provide road information on a front road of the vehicle. The display is configured to display virtual information by projecting on an information display region in front of a driver through augmented reality. The controller is configured to determine whether the front road is a slope road or a curved road based on the road information, determine whether the preceding vehicle exists in the information display region using the front image when it is determined that the front road is a slope road or a curved road, and control the display to display a virtual preceding vehicle in the information display region when it is determined that the preceding vehicle does not exist.

The controller may map the information display region to the front image and determine whether the preceding vehicle exists in the information display region.

The controller may stop the preceding vehicle following cruise when a lane of the vehicle is changed.

The virtual preceding vehicle may be indicated in a type of any one of an image, a text, and an animation.

The controller may stop displaying the virtual preceding vehicle and following driving when it is determined that the preceding vehicle does not exist in the information display region within a set time after displaying the virtual preceding vehicle.

The controller may stop displaying the virtual preceding vehicle and display a preceding vehicle indicator at a side of the preceding vehicle when it is determined that the preceding vehicle is detected in the information display region again within the set time.

The controller may be configured to determine whether the preceding vehicle deviates from the information display region, and the display may be configured to display the virtual preceding vehicle as an image other than an image of a vehicle when the controller determines that the preceding vehicle deviates from the information display region.

The present inventive concept is capable of avoiding the preceding vehicle following cruise control function being stopped because the preceding vehicle is temporarily not detected as the driving road is changed from a straight road into a slope road or a curved road during the preceding vehicle following cruise, and continuously displaying the preceding vehicle using augmented reality technologies. Accordingly, the present inventive concept can provide driving stability and convenience.

Also, the present inventive concept can be applied without rising of manufacturing cost by utilizing the existing system and just modifying the software.

BRIEF DESCRIPTION OF THE DRAWINGS

The above and other objects, features and advantages of the present inventive concept will be more apparent from the following detailed description taken in conjunction with the accompanying drawings, in which like reference characters may refer to the same or similar parts throughout the different views. The drawings are not necessarily to scale, emphasis instead being placed upon illustrating the principles of the embodiments of the inventive concept.

DETAILED DESCRIPTION

Hereinafter, with reference to the accompanying drawings, embodiments of the present inventive concept will be described in detail.

Figure 1:
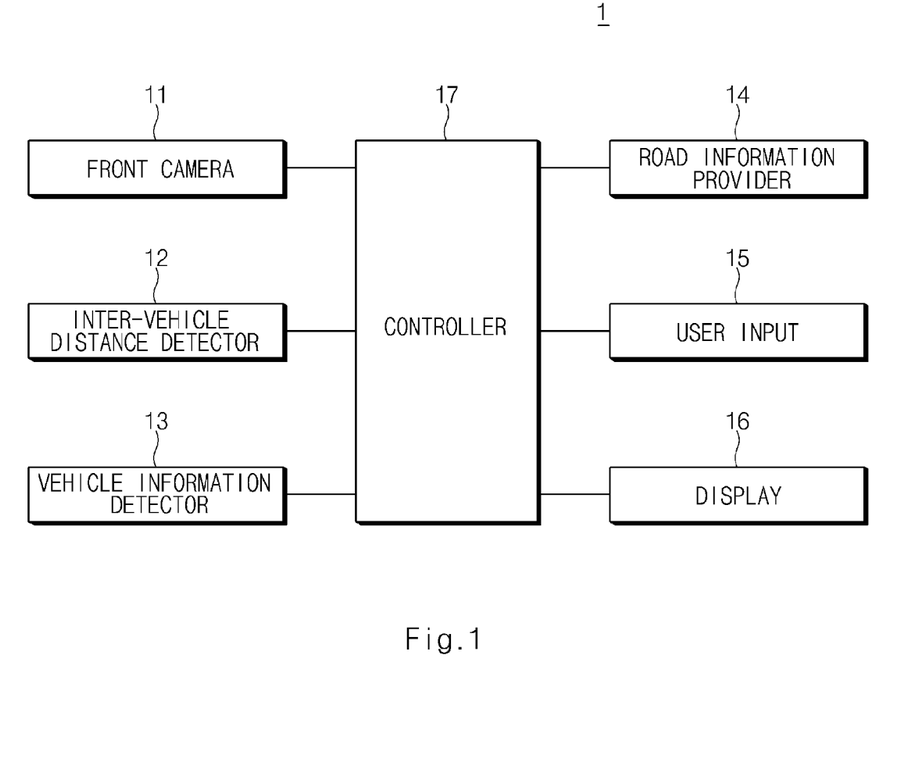
FIG. 1 is a block diagram of a vehicle cruise control apparatus according to an embodiment of the present inventive concept.

FIG. 1 is a block diagram of a vehicle cruise control apparatus according to an embodiment of the present inventive concept.

As shown in FIG. 1, the vehicle cruise control apparatus 1 may include a front camera 11, an inter-vehicle distance detector 12, a vehicle information detector 13, a road information provider 14, a user input 15, a display 16, and a controller 17.

The front camera 11 may be mounted to the front of the vehicle and take a front image of the vehicle. In addition, the front camera 11 may provide a lane shape of the front (e.g., road shape), determination for the size and the type of the preceding vehicle, and the reference coordinates matching the information display region with the real world. This front camera 11 may have 40 degrees (latitude)×20 degrees (longitude) angle of view and can detect objects (e.g., a preceding vehicle) of 8~60 m front distance from the vehicle.

The inter-vehicle distance detector 12 may measure, by a radar sensor, the distance from the preceding vehicle (following vehicle) which is located in the front of the vehicle. The radar sensor may have 20 degrees (latitude)×4.5 degrees (longitude) angle of detection and can detect vehicles (e.g., a preceding vehicle) of 1~170 m distance from the vehicle.

The vehicle information detector 13 may detect the vehicle information such as the posture and the speed of the vehicle, and may include a gyro sensor, a yaw rate sensor and the like. Here, the yaw rate sensor may be used to check whether the vehicle is turning or not and whether the vehicle is departing from the drive lane, the gyro sensor may be used to determine whether the vehicle is entering into a slope section and a curve section or not, and measure the angle of slope.

The road information provider 14 may provide road information for the driving front road. Here, the road information may be information for the road shape, the road shape may be classified into a straight road, a slope road (e.g., an uphill road or and a downhill road), and a curved road.

Further, the road information provider 14 may be implemented in a navigation terminal guiding the driver with a traveling route to the destination. At this time, the road information provider 14 may map the position of the vehicle with the map data and then transmit the road information for the front of the vehicle.

The user input 15 may be for receiving data and control commands from a user (e.g., a driver), and transmit the received data and control commands to the controller 17.

The display 16 may be implemented in a Head Up Display (HUD) projecting a virtual image (e.g., virtual information) in a visible region. This display 16 can display the vehicle up to which has 10 degrees×5 degrees display angle and is located in the front 10~100 m distance. In an embodiment of the present inventive concept, since a well-known head-up display for vehicle is used, the detailed description for its configuration will be omitted.

Also, the display 16 may superimpose the virtual information with the real world which is visible through the front glass, and display it. In other words, the display 16 may display the preceding vehicle followed by its vehicle as the virtual information using the augmented reality technologies. Here, the virtual information may consist of at least one of an image, a text and an animation.

The controller 17 may match the information display region of the display 16 on the basis of images taken by the front camera 11, and determine the field of view and detection region.

Further, the controller 17 may set the driving condition according to data inputted from the user input 15 and initiate the automatic drive. Here, the driving condition may include the driving speed and the inter-vehicle distance.

During the automatic drive, the controller 17 may determine a clear driving mode (e.g., a preceding driving mode) or a following driving mode as the operation mode according to whether a preceding vehicle exists in the front of the vehicle in the drive lane. Here, in the clear driving mode, if a preceding vehicle does not exist in the front of the vehicle in the drive lane, the vehicle cruise control apparatus 1 may control the drive speed of its vehicle and the inter-vehicle distance from the preceding vehicle on the basis of the set speed and inter-vehicle distance. And, in the following driving mode, if a preceding vehicle exists in the front of the vehicle in the drive lane, the vehicle cruise control apparatus 1 may control the drive speed of its vehicle to maintain the inter-vehicle distance from the preceding vehicle according to the drive speed of the preceding vehicle.

The controller 17 may determine the display mode according to the presence of the preceding vehicle in the information display region when operating in the following driving mode. Here, the display mode may be classified into a basic mode and a virtual mode.

The controller 17 may display the preceding vehicle indicator indicating the preceding vehicle of the real world if the preceding vehicle of the real world exists in the information display region on the basis of the front image inputted from the front camera 11 when operating in the following driving mode. Here, the preceding vehicle indicator may be implemented in the type of an image, a text, and animation and the like.

On the other hand, the controller 17 may switch the display mode to the virtual display mode if the preceding vehicle of the real world exists in the information display region during operating in the following driving mode and the basic display mode. And, the controller 17 may display the virtual preceding vehicle in the information display region during the set time. At this time, the controller 17 may display the virtual preceding vehicle at the top of the information display region as the type of an image, an animation or a text.

The controller 17 may release (e.g., stop) the following driving mode and the virtual display mode if the preceding vehicle of the real world is not detected in the information display region again until the set time elapses. That is, the controller 17 may release (e.g., stop) the following driving mode and the virtual display mode if the preceding vehicle does not appears again until a certain time elapses after the preceding vehicle on following disappears in the visual field of the driver.

Alternatively, the controller 17 may check whether the lane is changed or not by detecting the rotational angular velocity of the vehicle. As a result of the checking, the controller 17 may stop the preceding vehicle following cruise if the lane of its vehicle is changed.

Alternatively, the controller 17 may maintain the following driving mode and switch the virtual mode to the basic mode if the preceding vehicle of the real world exists in the information display region again within the set time.

Figure 2:
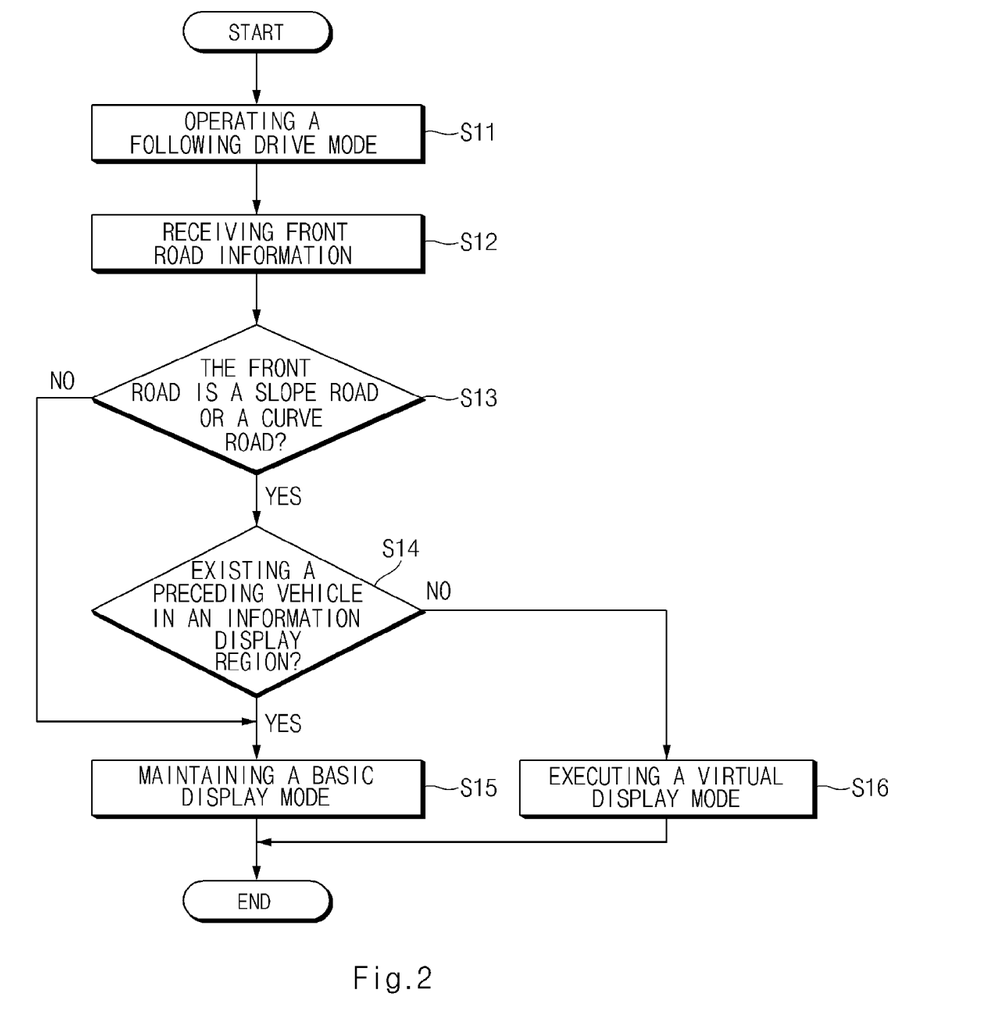
FIG. 2 is a flow chart showing a vehicle cruise control method according to an embodiment of the present inventive concept.

FIG. 2 is a flow chart showing a vehicle cruise control method according to an embodiment of the present inventive concept.

First, the vehicle cruise control apparatus 1 may control the drive speed of its vehicle according to the drive speed of the preceding vehicle which is located in the front of its vehicle in the drive lane (S11). At this time, the controller 17 of the vehicle cruise control apparatus 1 may control the drive of its vehicle on the basis of the drive condition set by the driver. Here, the drive condition may include the drive speed and the inter-vehicle distance from the preceding vehicle.

The controller 17 of the vehicle cruise control apparatus 1 may receive the road information for the front road from the road information provider 14 during operating in the following driving mode (S12). Here, the road information may include one of a straight road, a slope road (e.g., an ascending slope road or and a descending slope road) and a curved road.

The controller 17 may check whether the front road is a slope road or a curved road on the basis of the received road information (S13). That is, the controller 17 may check the shape of the front road of its vehicle.

The controller 17 may check whether the preceding vehicle exists in the information display region if the front road is a slope road or a curved road (S14). Here, the information display region may be a region allocated in the front visible region of the driver using the head-up display technology.

At this time, the controller 17 may extract the image corresponding to the information display region from the front image obtained by the front camera 11 and may check whether the preceding vehicle exists in the extracted image. In other words, the controller 17 may check whether the preceding vehicle is located in the front of its vehicle in the drive lane.

If the preceding vehicle exists, the controller 17 may display the preceding vehicle indicator in a side of the preceding vehicle based on the front image taken by the front camera 11. For example, the controller 17 may display the image of the bar shape at the bottom of the preceding vehicle in the information display region (S15).

In step 914, if the preceding vehicle does not exist in the information display region, the controller 17 may switch the display mode from the basic mode to the virtual display mode (S16).

Figure 3:
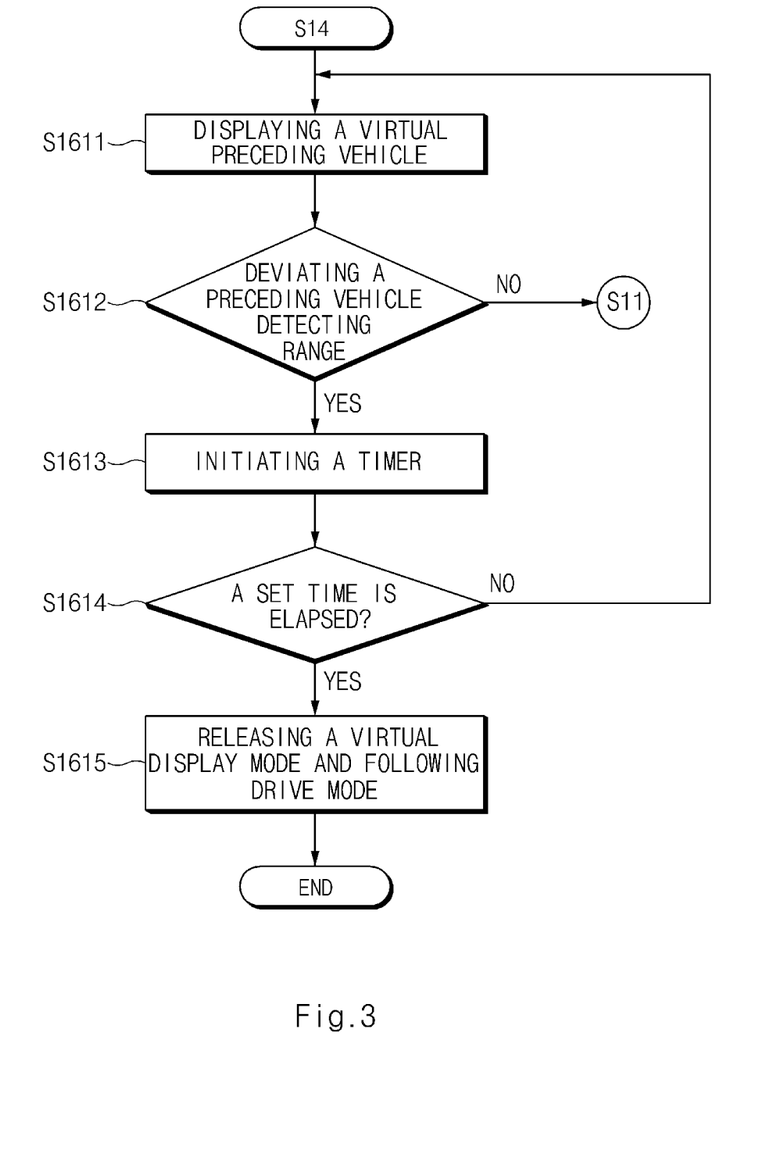
FIG. 3 is a flow chart showing a virtual display mode operation procedure according to an embodiment of the present inventive concept.

FIG. 3 is a flow chart showing a virtual display mode operation procedure according to an embodiment of the present inventive concept.

As shown in FIG. 3, the controller 17 may display the virtual preceding vehicle at the top of the information region if the preceding vehicle of the real world does not exist in the information display region (S1611).

Subsequently, the controller 17 may operate in a display mode and check whether the preceding vehicle deviates from the detection range of the inter-vehicle distance detector 12 (S1612). In other words, the preceding vehicle does not exist in the information display region, but the controller 17 may check whether the preceding vehicle is detected through the inter-vehicle distance detector 12.

If the preceding vehicle deviates from the detection range, the controller 17 may operate a timer (not shown) (S1613). If the set time has elapsed, the timer may transmit an interrupt signal to the controller 17 and may be initialized.

The controller 17 may check whether the time set in the timer is elapsed (S1614). That is, if the interrupt signal is received from the timer, the controller 17 may determine that the set time is elapsed. Here, the set time T is a time taken in moving to the inter-vehicle distance d at the speed v set by the driver. That is, the set time T can be expressed as the following Equation 1.

$$T = \frac{d}{v}(1 + A) \quad \text{[Equation 1]}$$

Here, A may be an arbitrary value [%].

If the set time is elapsed at step S1614, the controller 17 may release (e.g., stop) the virtual display mode and the following driving mode (S1615). In other words, the controller 17 may stop displaying the virtual preceding vehicle and following driving.

Figure 4:
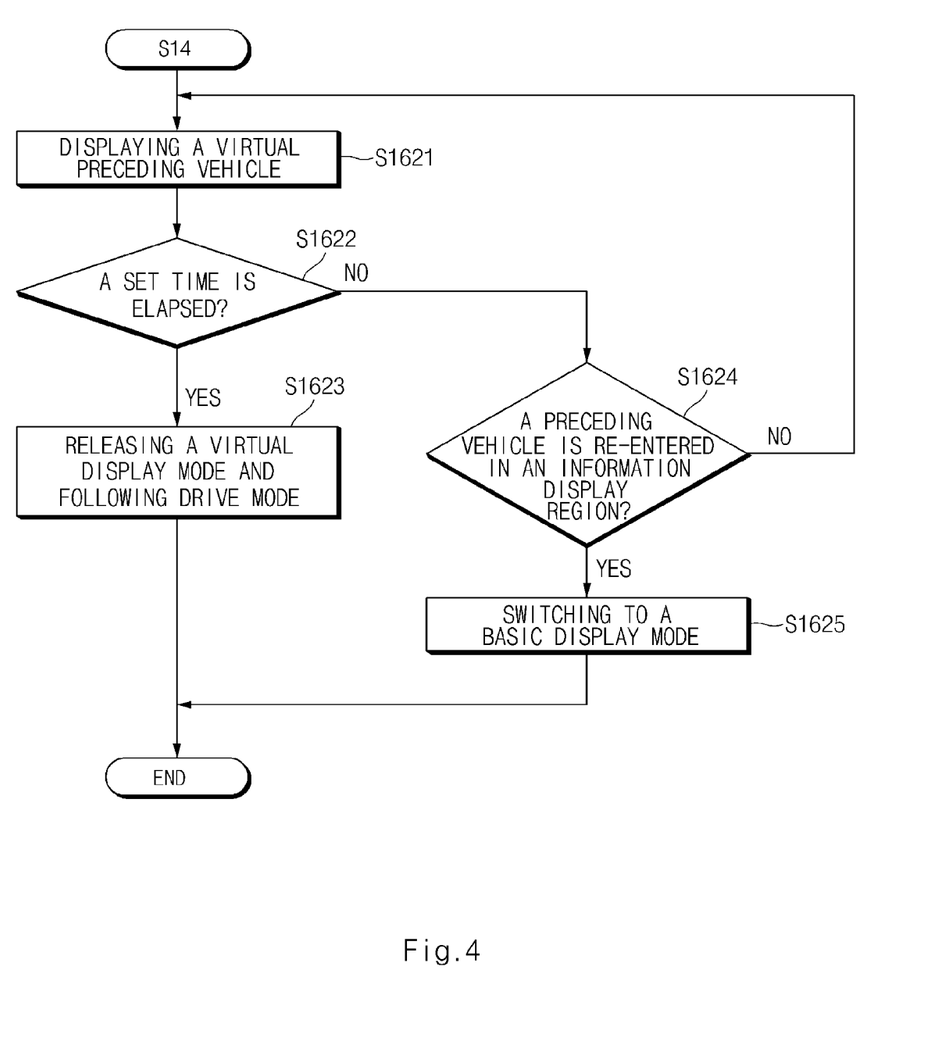
FIG. 4 is a flow chart showing a virtual display mode operation procedure according to another embodiment of the present inventive concept.

FIG. 4 is a flow chart showing a virtual display mode operation procedure according to another embodiment of the present inventive concept.

First, the controller 17 may display the virtual preceding vehicle in the information display region if the preceding vehicle does not exist in the information display region (S1621). For example, the controller 17 may display the image of the vehicle shape at the top in the information display region by controlling the display 16.

Subsequently, the controller 17 may display the virtual preceding vehicle and then check whether the set time is elapsed (S1622). In other words, the controller 17 may check whether a certain time is elapsed after switching to the virtual display mode.

If the set time is elapsed, the controller 17 may release (e.g., stop) the virtual display mode and the following driving mode (S1623).

On the other hand, if the set time is not elapsed, the controller 17 may check whether the preceding vehicle is detected in the information display region again (S1624). That is, the controller 17 may check whether its vehicle enters into the same lane section as the preceding vehicle.

If the preceding vehicle is detected in the information display region, the controller 17 may switch from the virtual display mode to the basic display mode again (S1625). At this time, the controller 17 may maintain the preceding vehicle following cruise.

Figure 5:
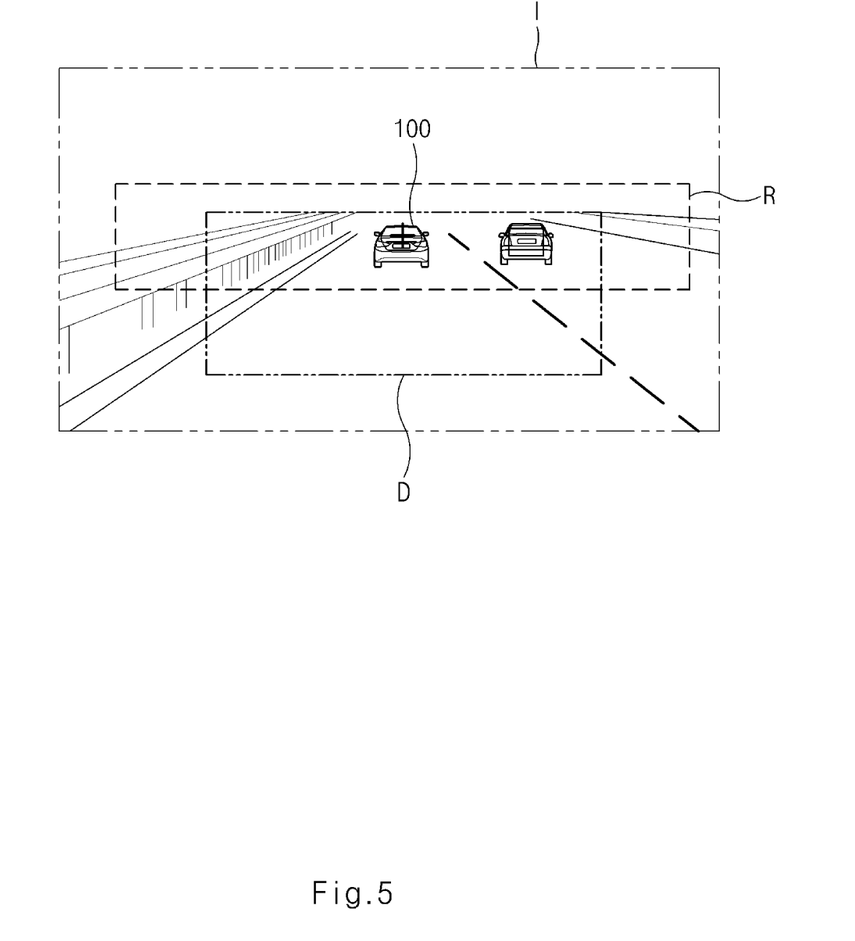
FIG. 5 is a diagram showing an information display region and an inter-vehicle distance detecting region mapping with a taken image according to the present inventive concept.

FIG. 5 is a diagram showing an information display region and an inter-vehicle distance detecting region mapping with a taken image according to the present inventive concept.

Referring to FIG. 5, the vehicle cruise control apparatus 1 may map the information display region D of the display 16 on the basis of the front image I taken by the front camera 11, and determine whether the preceding vehicle 100 exists in the information display region D on the basis of the boundary line of the information display region D.

Also, the inter-vehicle distance detecting region R may be a region capable of detecting the preceding vehicle 100 by a radar sensor. As shown in FIG. 5, the preceding vehicle 100 does not exist in the information display region D due to difference between the information display region D and inter-vehicle distance detecting region R, but it can be detected by the inter-vehicle distance detector 12.

Figure 6:
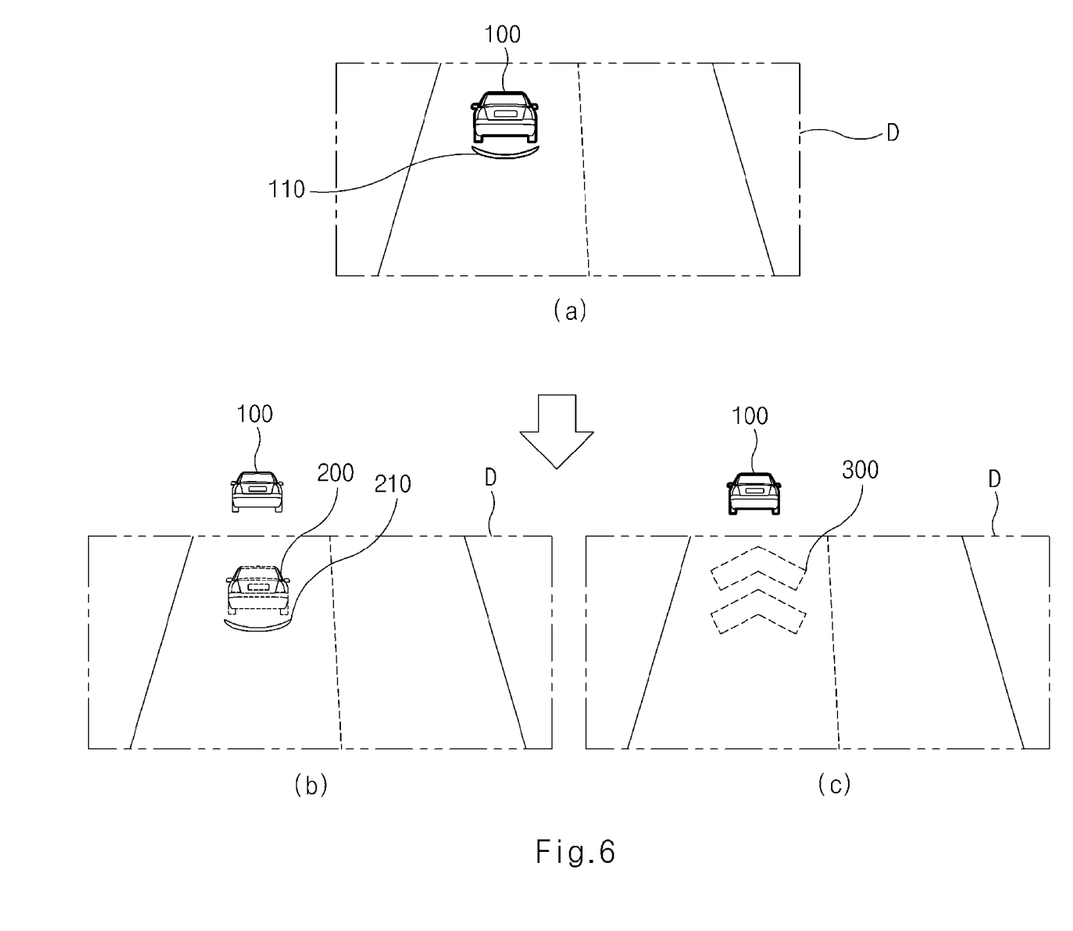
FIG. 6 is an exemplary diagram showing a preceding vehicle display screen according to the present inventive concept.

FIG. 6 is an exemplary diagram showing a preceding vehicle display screen according to the present inventive concept.

As shown in (a) of FIG. 6, if the preceding vehicle 100 of the real world is located in the information display region D, the vehicle cruise control apparatus 1 may display the preceding vehicle indicator 110 at the bottom of the preceding vehicle.

On the other hand, as shown in (b) and (c) of FIG. 6, if the preceding vehicle 100 of the real world deviates from the information display region D, as shown in (b) of FIG. 6, the virtual preceding vehicle 200 may be displayed and the preceding vehicle indicator 210 may be displayed at the bottom of the virtual preceding vehicle 200. At this time, the preceding vehicle 100 of the real world and the preceding vehicle indicator (110, 210) displayed at the bottom of the virtual preceding vehicle 200 may be visually, distinctively displayed.

Alternatively, as shown in (c) of FIG. 6, the vehicle cruise control apparatus 1 may display the virtual preceding vehicle 300 as a specific image, representing that the vehicle cruise control apparatus 1 is operating in the virtual display mode and the following driving mode.

As described above, although the present inventive concept has been described with reference to exemplary embodiments and the accompanying drawings, it would be appreciated by those skilled in the art that the present inventive concept is not limited thereto but various modifications and alterations might be made without departing from the scope defined in the following claims.

What is claimed is:

1. A vehicle cruise control method for performing a vehicle cruise control of a vehicle, comprising steps of:
   receiving, by a controller of a vehicle cruise control apparatus that is communicatively connected to a navigation terminal, road information on a road located in front of the vehicle from the navigation terminal during a preceding vehicle following cruise;
   determining, by the controller, whether the road located in front of the vehicle is a slope road or a curved road based on the received road information;
   determining, by the controller, based on an image captured by a front camera of the vehicle that is communicatively connected to the controller, whether the preceding vehicle is present in an information display region in front of a driver of the vehicle, when it is determined that the road located in front of the vehicle is the slope road or the curved road; and
   displaying, in a display mounted in the vehicle and communicatively connected to the controller, a virtual preceding vehicle in the information display region through augmented reality when it is determined that the preceding vehicle is not present.

2. A vehicle cruise control method according to claim 1, wherein the road information is classified as one of a straight road, a slope road, and a curved road.

3. A vehicle cruise control method according to claim 1, wherein the step of displaying a virtual preceding vehicle comprises steps of:
   displaying the virtual preceding vehicle and determining whether the preceding vehicle deviates from an inter-vehicle distance detecting range;
   operating a timer when it is determined the preceding vehicle deviates from the inter-vehicle distance detecting range;
   determining whether a set time is elapsed by the timer; and
   stopping displaying the virtual preceding vehicle and following driving when it is determined that the set time is elapsed.

4. A vehicle cruise control method according to claim 1, wherein the step of displaying a virtual preceding vehicle comprises steps of:
- determining whether a set time is elapsed after displaying the virtual preceding vehicle; and
- stopping displaying the virtual preceding vehicle and following driving when it is determined that the set time is elapsed.

5. A vehicle cruise control method according to claim 4, further comprising steps of:
- determining whether the preceding vehicle is re-detected in the information display region when it is determined the set time is not elapsed; and
- switching from a virtual display mode displaying the virtual preceding vehicle to a basic display mode when it is determined that the preceding vehicle is re-detected.

6. A vehicle cruise control method according to claim 5, wherein the set time is calculated based on a driving condition including at least one of a driving speed and an inter-vehicle distance set by the driver.

7. A vehicle cruise control method according to claim 1, further comprising step of maintaining a basic display mode, when it is determined that the preceding vehicle is present in the information display region.

8. A vehicle cruise control method according to claim 7, further comprising: in the basic display mode, displaying a preceding vehicle indicator at a side of the preceding vehicle located in the information display region.

9. A vehicle cruise control method according to claim 8, wherein the preceding vehicle indicator is implemented as a type of at least one of an image, a text, and an animation.

10. A vehicle cruise control apparatus, comprising:
- a front camera configured to obtain a front image of a road in which a vehicle is driving;
- an inter-vehicle distance detector configured to measure an inter-vehicle distance between the vehicle and a preceding vehicle;
- a road information provider configured to provide road information on a road located in front of the vehicle;
- a display configured to display virtual information by projecting the virtual information on an information display region in front of a driver of the vehicle through augmented reality; and
- a controller communicatively connected to the front camera, the inter-vehicle distance detector, the road information provider, and the display, and configured to:
  - determine whether the road located in front of the vehicle is a slope road or a curved road based on the road information provided by the road information provider while controlling driving of the vehicle according to the inter-vehicle distance measured by the inter-vehicle distance detector and a driving speed of the preceding vehicle,
  - determine whether the preceding vehicle is present in the information display region using the front image obtained by the front camera when it is determined that the road located in front of the vehicle is a slope road or a curved road, and
  - control the display to display a virtual preceding vehicle in the information display region when it is determined that the preceding vehicle is not present.

11. A vehicle cruise control apparatus according to claim 10, wherein the controller maps the information display region to the front image and determines whether the preceding vehicle is present in the information display region.

12. A vehicle cruise control apparatus according to claim 11, wherein the controller stops the preceding vehicle following cruise when a lane of the vehicle is changed.

13. A vehicle cruise control apparatus according to claim 10, wherein the virtual preceding vehicle is indicated in a type of any one of an image, a text, and an animation.

14. A vehicle cruise control apparatus according to claim 10, further comprising;
- a timer configured to transmit an interrupt signal to the controller when a set time has elapsed;
- wherein the controller operates the timer when it is determined that the preceding vehicle is not present in the information display region after displaying the virtual preceding vehicle, and stops displaying the virtual preceding vehicle and following driving when the interrupt signal is received from the timer.

15. A vehicle cruise control apparatus according to claim 14, wherein the controller stops displaying the virtual preceding vehicle and displays a preceding vehicle indicator at a side of the preceding vehicle when it is determined that the preceding vehicle is re-detected in the information display region within the set time.

16. A vehicle cruise control method according to claim 1, further comprising:
- determining whether the preceding vehicle deviates from the information display region; and
- displaying the virtual preceding vehicle as an image other than an image of a vehicle when it is determined that the preceding vehicle deviates from the information display region.

17. A vehicle cruise control apparatus according to claim 10, wherein:
- the controller is configured to determine whether the preceding vehicle deviates from the information display region; and
- the display is configured to display the virtual preceding vehicle as an image other than an image of a vehicle when the controller determines that the preceding vehicle deviates from the information display region.

* * * * *